United States Patent
Arakawa et al.

(10) Patent No.: US 11,702,719 B2
(45) Date of Patent: Jul. 18, 2023

(54) METHOD FOR RECOVERING LITHIUM FROM LITHIUM ION BATTERY SCRAP

(71) Applicant: JX NIPPON MINING & METALS CORPORATION, Tokyo (JP)

(72) Inventors: Junichi Arakawa, Tsuruga (JP); Yasufumi Haga, Tsuruga (JP); Junichi Ito, Tokyo (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 917 days.

(21) Appl. No.: 16/499,173

(22) PCT Filed: Mar. 28, 2018

(86) PCT No.: PCT/JP2018/013027
§ 371 (c)(1),
(2) Date: Sep. 27, 2019

(87) PCT Pub. No.: WO2018/181607
PCT Pub. Date: Oct. 4, 2018

(65) Prior Publication Data
US 2021/0108286 A1 Apr. 15, 2021

(30) Foreign Application Priority Data

Mar. 31, 2017 (JP) .................. 2017-072018

(51) Int. Cl.
| | |
|---|---|
| C22B 26/00 | (2006.01) |
| C22B 26/12 | (2006.01) |
| B02C 23/20 | (2006.01) |
| C22B 1/02 | (2006.01) |
| C22B 7/00 | (2006.01) |
| C22B 3/00 | (2006.01) |
| H01M 10/0525 | (2010.01) |
| H01M 10/54 | (2006.01) |
| B09B 3/80 | (2022.01) |

(52) U.S. Cl.
CPC .............. *C22B 26/12* (2013.01); *B02C 23/20* (2013.01); *B09B 3/80* (2022.01); *C22B 1/02* (2013.01); *C22B 7/007* (2013.01); *C22B 23/0453* (2013.01); *H01M 10/0525* (2013.01); *H01M 10/54* (2013.01); *B02C 2201/06* (2013.01)

(58) Field of Classification Search
CPC .......... C22B 26/12; C22B 1/02; C22B 7/006; C22B 7/007; C22B 23/0453; H01M 10/0525; H01M 10/54; B09B 3/80; B02C 23/20; B02C 2201/06
See application file for complete search history.

(56) References Cited

U.S. PATENT DOCUMENTS

| | | |
|---|---|---|
| 2011/0072936 A1 | 3/2011 | Narisako et al. |
| 2013/0312254 A1 | 11/2013 | Kim et al. |

FOREIGN PATENT DOCUMENTS

| | | | |
|---|---|---|---|
| CN | 1402376 A | 3/2003 | |
| CN | 102163760 A | 8/2011 | |
| CN | 104538695 A | 4/2015 | |
| CN | 104600389 A | 5/2015 | |
| CN | 105098279 A | 11/2015 | |
| EP | 2281781 A1 | 2/2011 | |
| EP | 2 305 841 A1 | 4/2011 | |
| EP | 2813587 A1 | 12/2014 | |
| EP | 3202929 A1 * | 8/2017 | ............ C22B 23/00 |
| JP | 2005-26089 A | 1/2005 | |
| JP | 4581553 B2 | 11/2010 | |
| JP | 2011-74410 A | 4/2011 | |
| JP | 2012-172223 A | 9/2012 | |
| JP | 2013-95951 A | 5/2013 | |
| JP | 2014-162982 A | 9/2014 | |
| JP | 2015-203131 * | 11/2015 | |
| JP | 2016-186118 A | 10/2016 | |
| WO | WO 2014/042136 A1 | 3/2014 | |
| WO | WO 2016/052568 A1 | 4/2016 | |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/013027, dated Oct. 10, 2019.
International Search Report for PCT/JP2018/013027 (PCT/ISA/210) dated May 29, 2018.
"Research on the Status Quo and Management Countermeasures of Waste Battery Disposal," China Environment Press, Apr. 2013, 6 pages total, with English translation.
Chinese Office Action and Search Report for corresponding Chinese Application No. 201880022661.0, dated Nov. 15, 2021, with English translation.
Chinese Office Action and Search Report, dated May 21, 2021, for corresponding Chinese Application No. 201880022661.0, with an English machine translation of the Chinese Office Action.

(Continued)

*Primary Examiner* — Steven J Bos
(74) *Attorney, Agent, or Firm* — Birch, Stewart, Kolasch & Birch, LLP

(57) ABSTRACT

A method for recovering lithium from lithium ion battery scrap according to this invention comprises subjecting lithium ion battery scrap to a calcination step, a crushing step, and a sieving step sequentially carried out, wherein the method comprises, between the calcination step and the crushing step, between the crushing step and the sieving step, or after the sieving step, a lithium dissolution step of bringing the lithium ion battery scrap into contact with water and dissolving lithium contained in the lithium ion battery scrap in the water to obtain a lithium-dissolved solution; a lithium concentration step of solvent-extracting lithium ions contained in the lithium-dissolved solution and stripping them to concentrate the lithium ions to obtain a lithium concentrate; and a carbonation step of carbonating the lithium ions in the lithium concentrate to obtain lithium carbonate.

16 Claims, 1 Drawing Sheet

(56) References Cited

OTHER PUBLICATIONS

Wang, "Ceramic Pigment Application and Preparation Technology," Jiangxi University Press, Jan. 2017, pp. 48 (total 6 pages), with an English translation.

Zhu, "A Handbook of Catalysts," Golden Shield Publishing House, Aug. 2008, pp. 8 (total 6 pages), with an English translation.

Extended European Search Report, dated Nov. 3, 2020, for European Application No. 18776696.9.

Xu et al., "A review of processes and technologies for the recycling of lithium-ion secondary batteries", Journal of Power Sources, 2008, vol. 177, pp. 512-527 (16 pages).

English Machine Translation of CN-102163760-A, dated Aug. 24, 2011.

Canadian Office Action for corresponding Canadian Application No. 3,058,311, dated Jul. 30, 2021.

\* cited by examiner

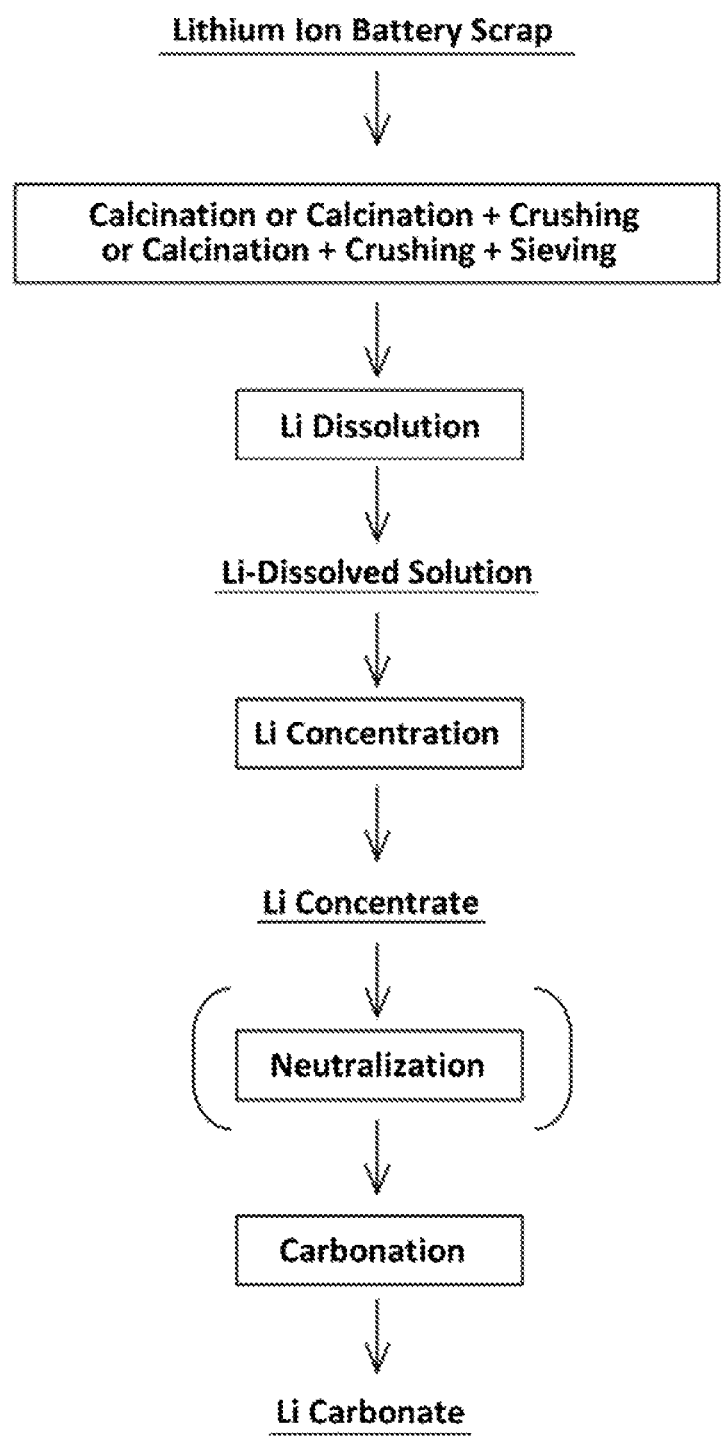

METHOD FOR RECOVERING LITHIUM FROM LITHIUM ION BATTERY SCRAP

TECHNICAL FIELD

The present invention relates to a method for recovering lithium from lithium ion battery scrap, and in particular, proposes a technique capable of effectively recovering lithium contained in lithium ion battery scrap.

BACKGROUND ART

In recent years, it has been widely studied that valuable metals such as nickel and cobalt are recovered from lithium ion battery scrap and the like discarded for expired product life or other reasons by means of wet processing or the like, in terms of effective utilization of resources.

For example, in order to recover valuable metals from lithium ion battery scrap, the lithium ion battery scrap is typically calcined to remove harmful electrolytes and then subjected to crushing and sieving in this order. Subsequently, battery powder obtained under a sieve for the sieving is leached by adding it to a leaching solution, whereby lithium, nickel, cobalt, manganese, iron, copper, aluminum and the like which can be contained therein are dissolved in the solution.

Then, iron, copper, aluminum, and the like are removed sequentially or simultaneously among the respective metal elements dissolved in the leached solution to recover valuable metals such as cobalt, manganese and nickel. More particularly, the leached solution is subjected to multiple stages of solvent extraction or neutralization according to the metals to be separated, and further, each solution obtained at each stage is subjected to stripping, electrolysis, carbonation or other treatments. Accordingly, a lithium-containing solution containing lithium ions is obtained.

The lithium-containing solution thus obtained is generally subjected to carbonation by adding a carbonate salt or blowing a carbon dioxide gas to recover a lithium ion contained in the lithium-containing solution as lithium carbonate.

As such a type of technique, Patent Document 1 discloses that a lithium ion is recovered as solid lithium carbonate by adjusting a pH of an aqueous solution containing lithium ions to pH 4 to 10 depending on acidic solvent extracting agent used for extraction of lithium ions, bringing the aqueous solution into contact with the acidic solvent extracting agent to extract lithium ions, and then bringing the solvent extracting agent into contact with an aqueous solution having a pH of 3.0 or less to strip lithium ions, repeating the above stripping operations using the resulting aqueous lithium ion solution to concentrate the lithium ions, and mixing the resulting high-concentration lithium ion aqueous solution with a water-soluble carbonate while maintaining the high-concentration lithium ion aqueous solution at 50° C. or higher.

CITATION LIST

Patent Literature

Patent Document 1: Japanese Patent No. 4581553 B

SUMMARY OF INVENTION

Technical Problem

However, the conventional method as described above recovers lithium from the lithium-containing solution finally obtained through a large number of steps such as leaching and multistage solvent extraction, so that the lithium-containing solution contains a significant amount or type of impurities due to reagents and additives used in the large number of steps.

This will result in deteriorated quality of lithium carbonate obtained by carbonation and causes a problem of increasing labors and costs required for purifying lithium carbonate to obtain high quality lithium carbonate.

This invention aims to solve such problems of the prior arts. An object of the present invention is to provide a method for recovering lithium, which can effectively recover lithium that is contained in lithium ion battery scrap.

Solution to Problem

The present inventors have focused on the fact that lithium contained in the lithium ion battery scrap after the calcination step is easily dissolved in water, whereas other metals are in a form which is difficult to dissolve in water. The present inventors have then found that the lithium ion battery scrap after the calcination step could be brought into contact with water to obtain a lithium-dissolved solution, and then the lithium-dissolved solution could be subjected to solvent extraction and stripping to increase a lithium ion concentration effectively.

Based on such findings, a method for recovering lithium from lithium ion battery scrap according to this invention comprises subjecting lithium ion battery scrap to a calcination step, a crushing step, and a sieving step sequentially carried out, wherein the method comprises, between the calcination step and the crushing step, between the crushing step and the sieving step, or after the sieving step, a lithium dissolution step of bringing the lithium ion battery scrap into contact with water and dissolving lithium contained in the lithium ion battery scrap in the water to obtain a lithium-dissolved solution; a lithium concentration step of solvent-extracting lithium ions contained in the lithium-dissolved solution and stripping them to concentrate the lithium ions to obtain a lithium concentrate; and a carbonation step of carbonating the lithium ions in the lithium concentrate to obtain lithium carbonate.

The lithium dissolution step is preferably carried out after the sieving step.

In the lithium concentration step, the solvent extraction and the stripping are repeatedly carried out over a plurality of times.

For the solvent-extracting in the lithium concentration step, a solvent extracting agent comprising 2-ethylhexyl 2-ethylhexylphosphonate or di-2-ethylhexylphosphoric acid is preferably used.

A pH during the solvent-extracting in the lithium concentration step is preferably from 5.0 to 6.5.

When the lithium concentrate obtained in the lithium concentration step contains nickel ions, the method for recovering lithium according to this invention further comprises a neutralization step of neutralizing the lithium concentrate to recover nickel before the carbonation step.

It is preferable that in the carbonation step, the carbonizing of lithium ions is carried out by adding a carbonate to or blowing a carbon dioxide gas into the lithium concentrate, and a temperature of the concentrate in the carbonating is 50° C. or higher.

Advantageous Effects of Invention

In the method for recovering lithium according to this invention, the lithium dissolution step is carried out between the calcination step and the crushing step, between the crushing step and the sieving step, or after the sieving step, and lithium ions in the lithium-dissolved solution thus obtained is concentrated by solvent extraction and stripping, whereby lithium carbonate with relatively high quality can be obtained in the carbonation step.

Therefore, according to method for recovering lithium according to this invention, lithium contained in the lithium ion battery scrap can be effectively recovered.

BRIEF DESCRIPTION OF DRAWINGS

FIG. 1 is a flowchart showing a lithium recovery method according to an embodiment of the present invention.

DESCRIPTION OF THE PREFERRED EMBODIMENTS

Hereinafter, embodiments of the present invention will be described in detail.

In the method for recovering lithium according to one embodiment of the present invention, when carrying out a calcination step, a crushing step, and a sieving step in this order on the lithium ion battery scrap, a lithium dissolution step is carried out between the calcination step and the crushing step (immediately after the calcination), between the crushing step and the sieving step (immediately after carrying out the calcination and crushing in this order), or after the sieving step (immediately after carrying out the calcination, crushing and sieving in this order), and after the lithium dissolution step, a lithium concentration step and a carbonation step are sequentially carried out, as illustrated in FIG. 1.

Here, in the lithium dissolution step, lithium contained in the lithium ion battery scrap is dissolved in water to obtain a lithium-dissolved solution. The lithium concentration step is a step of obtaining a lithium concentrate in which lithium ions are concentrated by solvent extraction and stripping of lithium ions contained in the lithium-dissolved solution. Further, the carbonation step is a step of carbonating the lithium ions in the concentrate to obtain lithium carbonate.

(Lithium Ion Battery Scrap)

Lithium ion battery scrap targeted by this invention is lithium ion batteries that can be used in mobile phones and other various electronic devices and have been discarded due to expired battery product life, production defects or other reasons. It is preferable to recover lithium from such lithium ion battery scrap in terms of effective utilization of resources.

Here, this invention is directed to lithium ion battery scrap containing at least lithium. In an embodiment of this invention, the lithium ion battery scrap generally contains from 0.1% to 10% by mass of lithium.

In general, the lithium ion battery scrap has a housing containing aluminum as an exterior that wraps around the lithium ion battery scrap. Examples of the housing include those made only of aluminum and those containing aluminum, iron, aluminum laminate, and the like.

The lithium ion battery scrap may also contain, in the above housing, positive electrode active materials composed of one or more single metal oxides or two or more composite metal oxides or the like, of ithium, nickel, cobalt and manganese, and aluminum foils (positive electrode substrate) to which the positive electrode active materials are applied and fixed by, for example, polyvinylidene fluoride (PVDF) or other organic binder. In addition, the lithium ion battery may contain copper, iron, or the like.

Further, the lithium ion battery scrap generally contains electrolytic solutions in the housing. For example, ethylene carbonate, diethyl carbonate or the like may be used as the electrolytic solution.

(Calcination Step)

In the calcination step, the lithium ion battery scrap is heated. The calcination step is generally carried out for the purposes of increasing a temperature of the lithium ion battery scrap, removing the internal electrolytic solutions to renders them harmless, and also decomposing the binder that binds the aluminum foils to the positive electrode active materials to facilitate separation of the aluminum foils from the positive electrode active materials during crushing and sieving and increase a recovery rate of the positive electrode active materials recovered under the sieve, and further changing a metal such as cobalt contained in the lithium ion battery scrap to a form of the metal which can be easily dissolved in the leaching with an acid, and the like.

Through the calcination step, lithium in the lithium ion battery scrap will be in the form of lithium oxide or lithium carbonate or the like, and this form of lithium is easily dissolved in water. On the other hand, metals such as cobalt are difficult to be dissolved in water. By utilizing such a difference of solubility in water of the metals contained in the lithium ion battery scrap after the calcination step to carried out a lithium dissolving step as described below, only lithium in the lithium ion battery scrap can be selectively removed to recover lithium at an early stage in processing of the lithium ion battery scrap. As a result, it is possible to prevent substances contained in various reagents that can be used in the processing of lithium ion battery scrap from being mixed into lithium carbonate finally obtained, whereby high quality lithium carbonate is produced.

From such a viewpoint, in the calcination step, the lithium ion battery scrap is preferably heated by maintaining it in a temperature range of from 550° C. to 650° C. for 1 hour to 4 hours. If the heating temperature is too low or the heating time is too short, the change of lithium to a form that is easily dissolved in water would be insufficient, and there is a concern that a large amount of lithium cannot be dissolved in the lithium dissolution step. On the other hand, if the heating temperature is too high or the heating time is too long, aluminum deteriorates to become powdered during crushing, and there is a risk that a large number of aluminum will be mixed in the sieved product. In addition, the above temperature is measurable by measuring a surface temperature of the housing of the lithium ion battery scrap.

The calcination step can be carried out by using various heating equipment such as a rotary kiln furnace or other various furnaces, and a furnace for heating in an air atmosphere, as long as the temperature of the lithium ion battery scrap can be controlled as described above.

(Crushing Step)

In this embodiment, after heating the lithium ion battery scrap in the calcination step, a crushing step of removing positive electrode materials and negative electrode materials from the housing is carried out.

In other embodiments, the lithium ion battery scrap after the calcination step can be subjected to a lithium dissolution step as described below. In this case, residues that remain undissolved in the lithium dissolution step can be subjected to the crushing step and a subsequent sieving step.

The crushing step is carried out to selectively separate the positive electrode active materials from the aluminum foils to which the positive electrode active materials are applied, while destroying the housing of the lithium ion battery scrap.

Various known apparatuses or devices can be used herein. In particular, it is preferable to use an impact-type crusher that can crush lithium ion battery scrap by applying an impact while cutting. Examples of the impact-type crusher include a sample mill, a hammer mill, a pin mill, a wing mill, a tornado mill, and a hammer crusher. It should be noted that a screen can be installed at an exit of the crusher, whereby the lithium ion battery scrap is discharged from the crusher through the screen when crushed to a size that can pass through the screen.

(Sieving Step)

In this embodiment, after crushing the lithium ion battery scrap in the crushing step, the lithium ion battery scrap is sieved using a sieve having an appropriate opening, for example, for the purpose of removing aluminum powder. Thus, for example, aluminum or copper remains on the sieve, and powdered lithium ion battery scrap from which aluminum or copper has been removed to some extent can be obtained below the sieve.

However, in other embodiments, after the crushing step, the lithium dissolution step as described later for dissolving lithium in the lithium ion battery scrap can be carried out, and in this case, residues remaining undissolved in the lithium dissolution step can be subjected to the sieving step.

(Lithium Dissolution Step)

After the calcination step, after the crushing step or after the sieving step, the lithium ion battery scrap is brought into contact with water in the lithium dissolving step to dissolve lithium contained in the lithium ion battery scrap in the water. This can provide a lithium-dissolved solution containing lithium ions.

In view of handling, the lithium dissolution step is preferably carried out after all of the calcination step, the crushing step, and the sieving step. For example, when the lithium dissolution step is carried out before the crushing step or before the sieving step, it is necessary to dry residues after lithium dissolution.

In the lithium dissolution step, as described above, lithium in the lithium ion battery scrap that has undergone the calcination step is dissolved in water, but other metals are hardly dissolved. Therefore, the lithium contained in the lithium ion battery scrap can be effectively separated herein.

Specifically, the water brought into contact with the lithium ion battery scrap is tap water, industrial water, distilled water, purified water, ion exchange water, pure water, ultrapure water, or the like.

The lithium-dissolved solution obtained after dissolving lithium has a high pH due to the dissolution of lithium. Therefore, an acid such as sulfuric acid may be added to the above water so that a pH of the lithium-dissolved solution is from 7 to 10. The acid may be added at any period before, during and/or after the dissolution of lithium. The pH of the lithium-dissolved solution finally obtained is preferably from 7 to 10.

The reason is that if the pH of the lithium-dissolved solution is less than 7, metals such as Co may begin to dissolve, and if it is more than 10, aluminum may begin to dissolve.

A method for bringing the lithium ion battery scrap into contact with the water includes various methods such as spraying, immersing, dipping, and the like. In terms of reaction efficiency, a method for immersing and stirring the lithium ion battery scrap in water is preferable.

A temperature of the solution during the contact of the lithium ion battery scrap with water can be from 10° C. to 60° C. A pulp concentration can be from 50 g/L to 150 g/L. The pulp concentration means a ratio of dry weight (g) of the lithium ion battery scrap to an amount of water (L) that is brought into contact with the lithium ion battery scrap.

In the lithium dissolution step, a leaching rate of lithium in water is preferably from 30% to 70%, and more preferably from 45% to 55%.

The lithium concentration of the lithium-dissolved solution is preferably from 1.0 g/L to 3.0 g/L, and more preferably from 1.5 g/L to 2.5 g/L. The lithium-dissolved solution may contain from 0 mg/L to 1000 mg/L of sodium and from 0 mg/L to 500 mg/L of aluminum.

Residues that remain without being dissolved in water, among the lithium ion battery scrap, are removed by solid-liquid separation, and they can be then subjected to acid leaching, solvent extraction, electrowinning or other treatments using known methods to recover various metals contained therein. Here, detailed descriptions of the residues are omitted.

(Lithium Concentration Step)

The lithium-dissolved solution obtained in the lithium dissolving step contains lithium ions at a relatively low concentration. In order to concentrate the lithium ions in the lithium-dissolved solution, a lithium concentration step is carried out by solvent extraction and stripping (back extraction).

A solvent extracting agent used herein preferably includes 2-ethylhexyl 2-ethylhexylphosphonate or di-2-ethylhexylphosphoric acid.

When the solvent extraction is carried out using such a solvent extracting agent, lithium is extracted from the lithium-dissolved solution (an aqueous phase) to the solvent extracting agent (an organic phase), and the organic phase is subjected to stripping. When the extraction and stripping are repeated over a plurality of times, the lithium concentration in the stripped solution increases, and finally lithium ions can be concentrated. This can provide a lithium concentrate containing a high concentration of lithium ions.

A pH during the solvent extraction is preferably from 5.0 to 6.5. If the pH is less than 5.0, Li may be stripped. If the pH is more than 6.5, the excessive high pH will result in poor phase separation, which may cause a risk of a step trouble.

A lithium concentration of the lithium concentrate is preferably from 5.0 g/L to 30.0 g/L, and more preferably from 10.0 g/L to 20.0 g/L.

(Neutralization Step)

The lithium concentrate may contain nickel ions derived from the lithium ion battery scrap or the like, for example in an amount of from 50 g/L to 150 g/L. In this case, a neutralization step can be carried out to separate and recover nickel from the lithium concentrate.

On the other hand, the neutralization step may be omitted when nickel is not contained in the lithium concentrate or when it is contained in a minor amount.

In the neutralization step, the lithium concentrate is neutralized by adding a calcium salt, a sodium salt, or the like to the lithium concentrate, thereby precipitating the nickel ions in the lithium concentrate as a solid, which is separated by solid-liquid separation. Examples of the calcium salt include calcium hydroxide, calcium oxide, and calcium carbonate. Examples of the sodium salt include sodium hydroxide. However, a type of the additive is not particularly limited as long as the additive can be increased to a desired pH.

A pH of the lithium concentrate before neutralization is, for example, from about −1 to 2. However, the pH of the lithium concentrate after neutralization is preferably 9 or more, particularly from 9 to 13 by adding the above calcium salt or the like. If the pH after neutralization is too low, it will result in insufficient nickel separation, which may cause a deterioration of the quality of lithium carbonate. On the other hand, if the pH after neutralization is too high, an amphoteric metal may be re-dissolved if the solution contains the amphoteric metal as an impurity.

In addition, after adding the calcium salt or the like to the lithium concentrate, the lithium concentrate can be stirred over a certain period of time to accelerate the reaction. In terms of improving the reaction efficiency, it is preferable that the temperature is relatively high and the stirring is relatively strong.

After nickel is precipitated as a given compound such as a hydroxide by addition of the calcium salt, or the like, nickel can be separated by solid-liquid separation using a known apparatus or method such as a filter press or thickener.

A nickel concentration in the neutralized solution is preferably 5 mg/L or less, particularly preferably 1 mg/L or less.

(Lithium Carbonation Step)

After the lithium concentration step or the neutralization step, the lithium concentrate is subjected to a lithium carbonation step to recover lithium contained in the lithium concentrate. Here, the lithium ions in the lithium concentrate are recovered as lithium carbonate by adding a carbonate to or blowing a carbon dioxide gas into the lithium concentrate.

After adding the carbonate or blowing the carbon dioxide gas, the concentrate is maintained at a temperature preferably in a range of from 50° C. to 90° C. for a certain period of time, with optionally stirring.

Examples of the carbonate added to the solution after neutralization include sodium carbonate.

An amount of the carbonate added can be, for example, 1.0 to 2.0 fold molar equivalent, preferably from 1.0 to 1.2 fold molar equivalent.

When the quality of lithium of the lithium carbonate thus obtained is lower than a target quality, the lithium carbonate can be purified as needed to obtain high quality lithium carbonate. Here, the target lithium quality of lithium carbonate can be, for example, 16% or more, and preferably 17% or more.

More particularly, the lithium carbonate is purified by subjecting the lithium carbonate obtained by adding the carbonate to the lithium concentrate to re-pulp washing, and also blowing carbon dioxide there to dissolve carbonic acid in the solution, and then separating a lithium hydrogen carbonate solution from calcium, magnesium and the like by solid-liquid separation. Subsequently, after deoxidizing and concentrating, purified lithium carbonate is separated from a filtrate by solid-liquid separation. If the impurity quality in the purified lithium carbonate is high, further washing can be carried out.

EXAMPLES

Next, the method for recovering lithium according to this invention was experimentally carried out and the effects thereof were confirmed, as described below. However, the descriptions herein are merely for illustrative and are not intended to be limited.

The calcination step, the crushing step and the sieving step were carried out in this order, and two types of lithium ion battery scrap A and B as shown in Table 1 under the sieve (<1 mm) were mixed, and the mixture was added to water at a pulp concentration of 117 g/L. The mixture was stirred for 1 hour at a solution temperature d of 10° C. and then allowed to stand for 2 hours to obtain a lithium-dissolved solution. The results are shown in Table 2.

The water was used in which 3% sulfuric acid was added to 1 fold molar equivalent of Mn to Zn in the lithium ion battery scrap.

TABLE 1

| | Wet Weight (kg) | Moisture Content (%) | Dry Weight (kg) | Mn | Co | Ni | Li | Fe | Al | Cu | Zn |
|---|---|---|---|---|---|---|---|---|---|---|---|
| Scrap A | 273.5 | 1 | 271.6 | 1.0 | 32.3 | 6.8 | 4.3 | 0.3 | 8.4 | 2.5 | 0.0 |
| Scrap B | 254.0 | 0 | 253.4 | 1.2 | 25.8 | 3.5 | 3.8 | 0.3 | 5.5 | 2.8 | 0.0 |

TABLE 2

| | Li | Na | Al |
|---|---|---|---|
| Leaching Rate (%) | 54 | — | 0 |
| Leaching Concentration (g/L) | 2.5 | 0.037 | 0.022 |

In view of the foregoing, it was found that lithium in the lithium ion battery scrap could be effectively dissolved in water, and the lithium-dissolved solution contained substantially no sodium or the like.

What is claimed is:

1. A method for recovering lithium from lithium ion battery scrap which has been subjected to a calcination step performed in a temperature range of from 550° C. to 650° C., the method comprising:
   a lithium dissolution step of bringing the lithium ion battery scrap into contact with water and dissolving lithium contained in the lithium ion battery scrap in the water to obtain a lithium-dissolved solution;
   a lithium concentration step of solvent-extracting lithium ions contained in the lithium-dissolved solution and stripping said lithium ions to concentrate the lithium ions to obtain a lithium concentrate; and
   a carbonation step of carbonating the lithium ions in the lithium concentrate to obtain lithium carbonate,
   wherein a pH of the lithium-dissolved solution is from 7 to 10.

2. The method according to claim 1, wherein in the lithium concentration step, said solvent-extracting and the stripping are repeatedly, carried out a plurality of times.

3. The method according to claim 1, wherein for the solvent-extracting in the lithium concentration step, a solvent extracting agent comprising 2-ethylhexyl 2-ethylhexylphosphonate or di-2-ethylhexylphosphoric acid is used.

4. The method according to claim 1, wherein a pH during the solvent-extracting in the lithium concentration step is from 5.0 to 6.5.

5. The method according to claim 1,
   wherein the lithium concentrate obtained in the lithium concentration step contains nickel ions, wherein the method further comprises a neutralization step of neutralizing the lithium concentrate to recover nickel before the carbonation step.

6. The method according to claim 1, wherein in the carbonation step, the carbonizing of lithium ions is carried out by adding a carbonate to or blowing a carbon dioxide gas into the lithium concentrate, and a temperature of the concentrate in the carbonating is 50° C. or higher.

7. The method according to claim 1, further comprising subjecting the lithium ion battery scrap to a calcination step, to a crushing step, and a sieving step.

8. The method according to claim 6,
wherein the crushing step and the sieving step are performed in this order, and
wherein the lithium dissolution step is performed before the crushing step, between the crushing step and the sieving step, or after the sieving step.

9. The method according to claim 8, wherein the lithium dissolution step is carried out after the sieving step.

10. The method according to claim 1, wherein the lithium ion battery scrap which has been subjected to a calcination step contains lithium oxide or lithium carbonate.

11. The method according to claim 1, wherein in the lithium dissolution step, an acid is added to the water so that the pH of the lithium-dissolved solution is from 7 to 10.

12. The method according to claim 1, wherein in the lithium dissolution step, a leaching rate of lithium in water is from 30% to 70%.

13. The method according to claim 1, wherein in the lithium dissolution step, a leaching rate of lithium in water is from 45% to 55%.

14. The method according to claim 1, wherein a lithium concentration of the lithium-dissolved solution is from 1.0 g/L to 3.0 g/L.

15. The method according to claim 1, wherein a lithium concentration of the lithium-dissolved solution is from 1.5 g/L to 2.5 g/L.

16. The method according to claim 1, wherein an aluminum concentration of the lithium-dissolved solution is from 0 mg/L to 500 mg/L.

* * * * *